July 28, 1931.    F. J. OSBORN ET AL    1,816,788
FRAME FOR VEHICLES
Filed May 20, 1929    3 Sheets-Sheet 1

INVENTORS:
Frederick J. Osborn
Norman F. Wood
BY
Richard E. Babcock
ATTORNEY

July 28, 1931.  F. J. OSBORN ET AL  1,816,788
FRAME FOR VEHICLES
Filed May 20, 1929  3 Sheets-Sheet 2

INVENTORS:
Frederick J. Osborn
Norman F. Wood
BY
Richard E. Babcock
ATTORNEY

Patented July 28, 1931

1,816,788

UNITED STATES PATENT OFFICE

FREDERICK JOHN OSBORN AND NORMAN FREDERICK WOOD, OF GOSPORT, ENGLAND

FRAME FOR VEHICLES

Application filed May 20, 1929, Serial No. 364,499, and in Great Britain May 25, 1928.

The present invention relates to frames for vehicles, especially frames for motor cycles and like vehicles, and has more particular reference to the method of mounting and springing the rear wheel of a motor cycle or the like.

In carrying out the invention radius rods are employed for transmitting the thrust from the wheel to the frame in known manner. These radius rods are pivoted to the frame as close as possible to the shaft from which the final drive to the rear wheel is taken off. This is to enable the wheel axle to move in an arc as closely as possible coincident with an arc having said shaft as centre, and when a longitudinal shaft drive to the wheel is used, a sliding joint in this shaft may be dispensed with.

It is an object of the invention to reduce the side play in a wheel so mounted and to eliminate side strains and axial loads in the radius rod main bearings. A further object is to reduce to a minimum the unsprung weight.

According to this invention, the rear ends of the radius rods are supported sideways by shackle links which connect the radius rods to a member movably mounted on the main frame of the vehicle, thus at the same time permitting free up and down movement of the rods.

Figure 1:
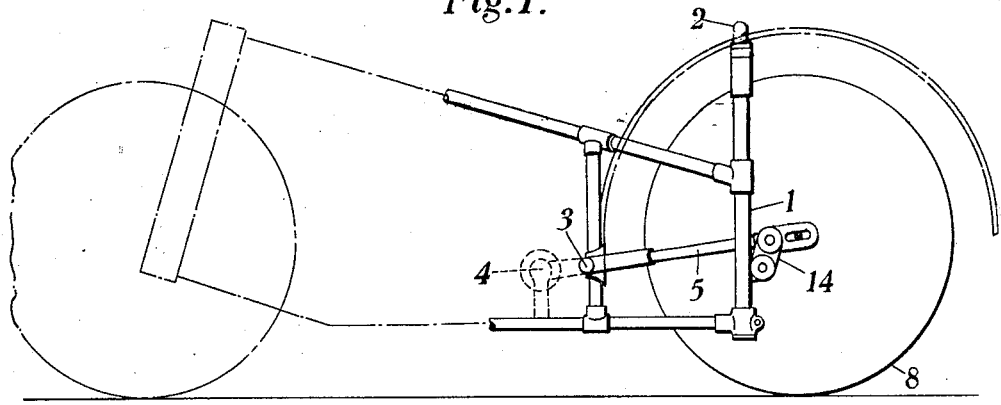
Figure 5:
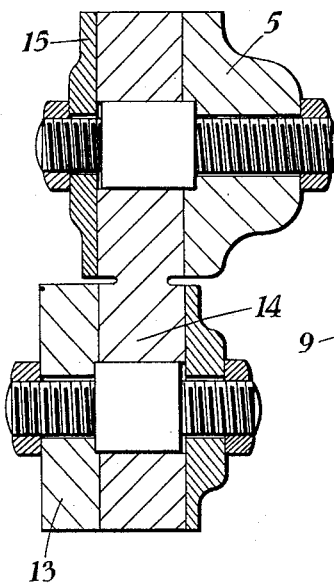
Figure 7:
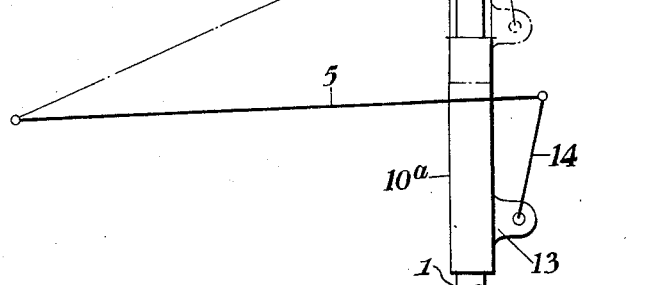
Figure 2:
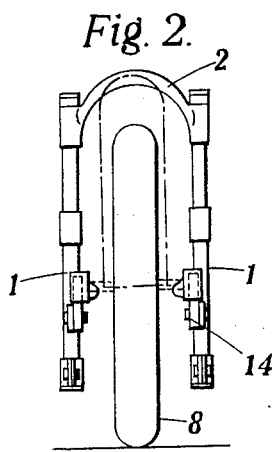
Figure 9:
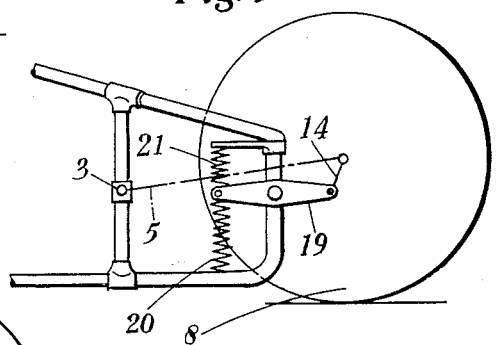
Figure 8:
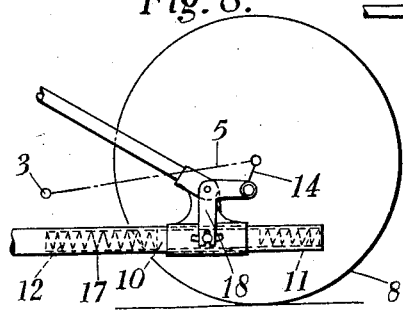
Figure 3:
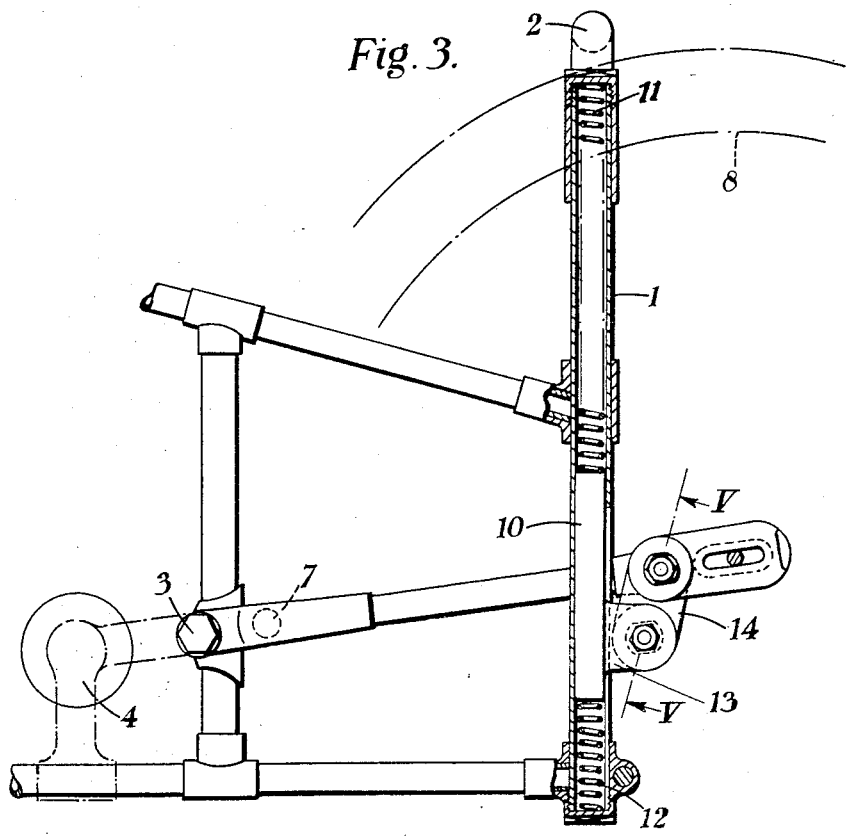
Figure 4:
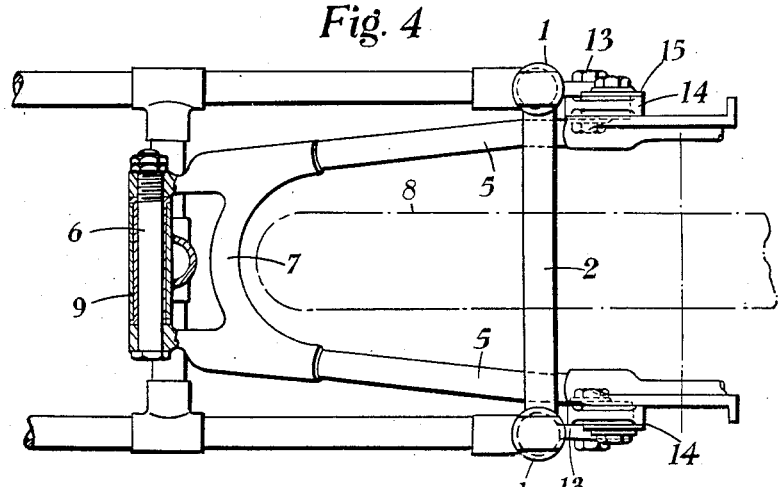

The accompanying drawings illustrate a motor cycle frame embodying the invention in various modifications. Fig. 1 is a diagrammatic side elevation and Fig. 2 a partial end view thereof, Fig. 3 is an enlarged portion of Fig. 1 partly in section, Fig. 4 is a plan of Fig. 3, Fig. 5 is a section on V V Fig. 3, Fig. 6 is a plan of a modification, and Figs. 7–9 are elevational diagrams of further modifications.

Figs. 1–4 show a frame of the duplex type having in each side component a rear member 1, substantially vertical, connected at their upper ends by a bridge 2. Pivoted to the frame at 3 slightly to the rear of the final drive shaft centre 4 is a radius rod frame structure comprising radius rods 5 rigidly connected by their pivot shaft 6 and a bridge 7. However, the bridge 7 is not essential.

Pivot shaft 6 transmits the driving thrust from the rear wheel 8 to the frame through the bearing 9. Inside each frame rear member 1 is a plunger 10 slidably mounted between load and rebound springs 11 and 12 respectively. Each plunger 10 carries a lug 13 which projects through a slot in tube 1, and shackle links 14 connect these lugs with the outer ends of the radius rods. As shown in Fig. 5, the pivotal joint between the links 14 and radius rods may incorporate a shock absorber in the form of a fraction damper with the thrust washer 15. The construction and fit of the pivots at each end of the links 14 are such that side thrust on the rear ends of the radius rods is transmitted direct to the frame through the plunger 10, thereby relieving the radius rod bearing 9 of all side strain. Thus by the elimination of side strains on the radius rods and the use of the latter to transmit only longitudinal thrust to the frame, the rods may be of much lighter construction than usual whereby the unsprung weight is reduced to little more than that of the wheel and axle alone. In consequence, the elimination of axial loads on the radius rod main bearings reduces wear and side play therein.

Figure 6:
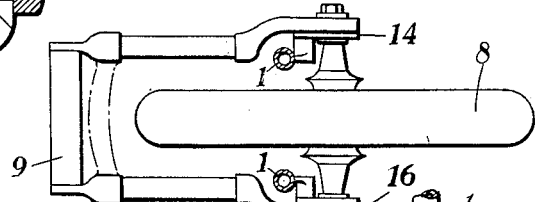

In the modification shown in Fig. 6, the rear fork ends 16 of the radius rods are cranked and located outside the frame tubes 1 and the shackles 14 are pivoted to the radius rods in line with the wheel axle.

In the diagrams Figs. 7–9 the radius rods and shackles are represented by single lines for simplicity. In Fig. 7, the only difference is that plunger 10 is replaced by a sleeve 10a sliding on the outside of the frame tube 1. In Fig. 8 the plunger 10 and load rebound springs 11 and 12 are located inside a substantially horizontal frame tube 17, in this case the bottom frame member. A bell crank 18 pivoted to the frame is then employed to transmit the motion from the shackle 14 to the plunger 10. In Fig. 9 the shackles 14 are pivoted between the radius rods 5 and levers 19 pivoted to the frame, the load springs 20 and rebound springs 21 being located between the other ends of levers 19 and abutments on the frame.

Although the frame tubes 1 are shown as vertical, it is not essential that they should be so, and it is also to be understood that the invention is equally applicable to any vehicle having a sprung wheel connected to the frame by means of radius rods.

What we claim as our invention and desire to secure by Letters Patent is:—

1. In a vehicle frame employing a radius rod to transmit thrust in the direction of its length between a road wheel and the frame, a shackle link connection between the radius rod and a plunger sliding within a tubular frame member against a load-carrying spring for the wheel associated with the radius rod.

2. A motor cycle frame having a sprung rear wheel mounted on radius rods and with a tubular member on each side of said wheel, in which the outer ends of the radius rods are connected by shackle links with a member movably mounted on said tubular member.

3. In a vehicle frame employing a radius rod to transmit thrust in the direction of its length between a road wheel and the frame, a frame member adjacent the outer end of the radius rod, means movably associated with said frame member, and a shackle link connection between the radius rod and said means to afford rigid lateral support with respect to the frame to the outer end of the radius rod whereby axial thrust on the radius rod bearing is substantially eliminated.

4. In a vehicle frame employing a radius rod to transmit thrust in the direction of its length between a road wheel and the frame, a frame member adjacent the outer end of the radius rod and extending substantially in the direction of motion of the rod end, a member slidably mounted on said frame member, and a shackle link connection between the radius rod and said slidable member.

In testimony whereof we affix our signatures.

FREDERICK JOHN OSBORN.
NORMAN FREDERICK WOOD.